(12) United States Patent
Smith et al.

(10) Patent No.: US 12,306,947 B2
(45) Date of Patent: May 20, 2025

(54) RANSOMWARE COUNTERMEASURES

(71) Applicant: Halcyon Tech, Inc., Austin, TX (US)

(72) Inventors: Ryan Smith, Austin, TX (US);
Jonathan Miller, Poway, CA (US)

(73) Assignee: Halcyon Tech, Inc., Austin, TX (US)

( * ) Notice: Subject to any disclaimer, the term of this patent is extended or adjusted under 35 U.S.C. 154(b) by 218 days.

(21) Appl. No.: 18/170,441

(22) Filed: Feb. 16, 2023

(65) Prior Publication Data
US 2023/0267197 A1 Aug. 24, 2023

Related U.S. Application Data

(60) Provisional application No. 63/311,684, filed on Feb. 18, 2022.

(51) Int. Cl.
| | | |
|---|---|---|
| *G06F 21/56* | (2013.01) | |
| *G06F 21/53* | (2013.01) | |
| *G06F 21/54* | (2013.01) | |
| *G06F 21/55* | (2013.01) | |

(52) U.S. Cl.
CPC .......... *G06F 21/566* (2013.01); *G06F 21/53* (2013.01); *G06F 21/54* (2013.01); *G06F 21/554* (2013.01)

(58) Field of Classification Search
CPC ........ G06F 21/566; G06F 21/53; G06F 21/54; G06F 21/554; G06F 21/56; G06F 21/568
See application file for complete search history.

(56) References Cited

U.S. PATENT DOCUMENTS

| | | | |
|---|---|---|---|
| 9,317,686 B1* | 4/2016 | Ye | G06F 21/568 |
| 10,706,151 B2 | 7/2020 | Hajmasan et al. | |
| 10,986,127 B1* | 4/2021 | Sellers | H04L 41/40 |
| 11,640,471 B2* | 5/2023 | Lekies | G06F 9/547 |
| | | | 726/25 |
| 2016/0323316 A1* | 11/2016 | Kolton | H04L 63/1491 |
| 2017/0223031 A1* | 8/2017 | Gu | G06F 11/1448 |
| 2017/0316204 A1* | 11/2017 | Thakur | H04L 63/1425 |
| 2018/0189490 A1* | 7/2018 | Maciejak | G06F 21/566 |

(Continued)

FOREIGN PATENT DOCUMENTS

WO WO-2022002405 A1 * 1/2022

OTHER PUBLICATIONS

Author: Abhinav Gupta, Aditi Prakash, Nolen Scaife Title: "Prognosis Negative: Evaluating Real-Time Behavioral Ransomware Detectors", IEEE European Symposium on Security and Privacy Published: 2021 (Year: 2021).*

(Continued)

*Primary Examiner* — Peter C Shaw
(74) *Attorney, Agent, or Firm* — Jones Day

(57) ABSTRACT

Execution of an executable is initiated in an operating environment. Thereafter, characteristics associated with the execution of the executable are continually monitored. It is later determined that the executable has one or more characteristics associated with ransomware. In response to such determination, at least one simulacra is injected into the operating environment to attempt to trigger an anti-detonation protection feature by the executable file. Thereafter, one or more ransomware countermeasures can be initiated based on behavior of the executable after injection of the at least one simulacra. Related apparatus, systems, techniques and articles are also described.

20 Claims, 5 Drawing Sheets

(56) References Cited

U.S. PATENT DOCUMENTS

| | | | |
|---|---|---|---|
| 2018/0293379 A1* | 10/2018 | Dahan | G06F 21/568 |
| 2018/0314514 A1* | 11/2018 | Garg | H04L 43/55 |
| 2018/0359272 A1* | 12/2018 | Mizrachi | H04L 67/535 |
| 2019/0028494 A1* | 1/2019 | Mizrachi | G06F 21/552 |
| 2019/0073475 A1* | 3/2019 | Gupta | G06F 21/565 |
| 2019/0089737 A1* | 3/2019 | Shayevitz | H04L 63/1425 |
| 2019/0102544 A1 | 4/2019 | Huang et al. | |
| 2019/0158512 A1* | 5/2019 | Zhang | H04L 63/1416 |
| 2019/0222604 A1* | 7/2019 | Vaidya | H04L 63/1416 |
| 2019/0228153 A1* | 7/2019 | Scaife | G06F 21/6218 |
| 2019/0238583 A1* | 8/2019 | Vaidya | H04L 63/1491 |
| 2019/0266327 A1* | 8/2019 | Satpathy | G06F 21/566 |
| 2019/0303573 A1 | 10/2019 | Chelarescu et al. | |
| 2020/0089876 A1* | 3/2020 | Aharoni | G06F 21/554 |
| 2020/0125721 A1* | 4/2020 | Antony | H04L 63/0209 |
| 2020/0177612 A1* | 6/2020 | Kras | G06N 20/00 |
| 2020/0204589 A1* | 6/2020 | Strogov | H04L 63/1416 |
| 2020/0372153 A1* | 11/2020 | Thakkar | G06F 21/568 |
| 2021/0026961 A1* | 1/2021 | Underwood | G06F 16/9027 |
| 2021/0099476 A1* | 4/2021 | Montgomery | H04L 63/1425 |
| 2021/0152595 A1* | 5/2021 | Hansen | G06F 21/568 |
| 2021/0160264 A1 | 5/2021 | Adir et al. | |
| 2021/0160265 A1 | 5/2021 | Chittaro | |
| 2022/0109692 A1* | 4/2022 | Hebert | G06F 9/547 |
| 2022/0182395 A1* | 6/2022 | Cai | H04L 63/145 |
| 2022/0292195 A1* | 9/2022 | Holland | G06F 21/6218 |
| 2023/0039302 A1* | 2/2023 | Castrejon, III | G06F 21/554 |
| 2023/0063792 A1* | 3/2023 | Burugula | G06F 3/0619 |
| 2023/0078476 A1* | 3/2023 | Venkatachalam | G06F 21/566 726/24 |
| 2023/0078950 A1* | 3/2023 | Aharoni | G06F 21/554 726/23 |
| 2023/0229773 A1* | 7/2023 | Madden, Jr. | G06F 21/554 726/23 |
| 2023/0319108 A1* | 10/2023 | Gechman | G06F 40/284 726/22 |
| 2024/0095341 A1* | 3/2024 | Venkataramani | G06F 21/54 |
| 2024/0291863 A1* | 8/2024 | Cohen | H04L 63/1491 |

OTHER PUBLICATIONS

Denham et al., "Ransomware and Malware Sandboxing," 2022 IEEE 13th Annual Ubiquitous Computing, Electronics & Mobile Communication Conference (UEMCON), New York, NY, NY, USA, 2022, pp. 0173-0179, doi: 10.1109/UEMCON54665.2022.9965664. (Year: 2022).*

Ganfure et al., "RTrap: Trapping and Containing Ransomware With Machine Learning," in IEEE Transactions on Information Forensics and Security, vol. 18, pp. 1433-1448, 2023, doi: 10.1109/TIFS.2023.3240025. (Year: 2023).*

Jiao et al., "Analysis and Detection of Android Ransomware for Custom Encryption," 2021 IEEE 4th International Conference on Computer and Communication Engineering Technology (CCET), Beijing, China, 2021, pp. 220-225, doi: 10.1109/CCET52649.2021.9544366. (Year: 2021).*

Zhuravchak et al., "Ransomware Prevention System Design based on File Symbolic Linking Honeypots," (IDAACS), Cracow, Poland, 2021, pp. 284-287, doi: 10.1109/IDAACS53288.2021.9660913. (Year: 2021).*

International Search Report mailed Jun. 8, 2023 for International Patent Application No. PCT/US2023/062783.

* cited by examiner

RANSOMWARE COUNTERMEASURES

RELATED APPLICATION

The current application claims priority to U.S. Pat. App. Ser. No. 63/311,684 filed on Feb. 18, 2022, the contents of which are hereby fully incorporated by reference.

TECHNICAL FIELD

The subject matter described herein relates to the use of advanced techniques to counter ransomware from infiltrating and exploiting one or more computing systems.

BACKGROUND

Ransomware is an increasingly pervasive type of malicious software (malware) in which access to personal or enterprise data is perpetually blocked until a ransom is paid. In particular, the personal or enterprise data is encrypted (often in situ) and the means to decrypt such data is only provided after receipt of a payment (often in cryptocurrency).

SUMMARY

In a first aspect, execution of an executable is initiated in an operating environment. Thereafter, characteristics associated with the execution of the executable are continually monitored. It is later determined that the executable has one or more characteristics associated with ransomware. In response to such determination, at least one simulacra is injected into the operating environment to attempt to trigger an anti-detonation protection feature by the executable file. Thereafter, one or more ransomware countermeasures can be initiated based on behavior of the executable after injection of the at least one simulacra.

The at least one simulacra can be or comprise a software executable or processes that simulate properties of the operating environment for ransomware behavior amplification and/or for triggering ransomware self-immolation.

Information about the ransomware (e.g., information characterizing interaction with the at least one simulacra byproducts, etc.) can be collected by an entrapment component.

The at least one simulacra can cause at least one system component of the operating environment to be obscured.

The at least one simulacra can cause an identity type of at least one system component of the operating environment to change.

The at least one simulacra can initiate a sandbox environment in which the executable is executed and monitored by a virtual machine.

The at least one simulacra can spoof or change a location of endpoints forming part of the operating environment.

The at least one simulacra can deploy bait files which appear to comprise sensitive information for access by the ransomware.

The at least one simulacra can create fake servers to interact with the ransomware to confirm malicious intent and/or disable the ransomware.

The at least one simulacra can create fake servers to interact with the ransomware to confirm malicious intent and/or disable the ransomware.

The at least one simulacra can cause the ransomware to conclude that a corresponding endpoint or server accessing the executable is not valuable.

The at least one simulacra can indicate that the corresponding endpoint or server is a virtual machine.

The at least one simulacra can cause files of interest to be hidden from the ransomware.

The at least one simulacra can generate artifacts that ransomware would likely generate to prevent the ransomware from taking certain actions. Such generated artifacts can include a mutex, flag file, or custom file extension to prevent the ransomware from double encrypting data in the operating environment.

The at least one simulacra can simulate a presence of multiple endpoint protection products on each endpoint and/or server forming part of the operating environment such that attempts to disable such multiple endpoint protection products are monitored.

The at least one simulacra can simulate a presence of backup software which the ransomware attempts to stop and remove previous backups.

In an interrelated aspect, data is received that comprises or characterizes an executable and dynamic linked library (DLL). Features are then extracted from the executable and DLL. The extracted features are input into at least one machine learning model to generate a suspiciousness score. The machine learning model can be trained to determine whether the executable file comprises ransomware. An execution chain of trust score for the executable and DLL can later be determined based on the extracted features and the suspiciousness score. This execution chain of trust score for the executable and DLL characterizes one or more associated parent processes. This suspiciousness score and the execution chain of trust score can be used to determine whether or not to initiate one or more ransomware countermeasures.

The one or more ransomware countermeasures can include limiting functionality of processes associated with the executable and DLL when the execution chain of trust score is within a first range and preventing the processes associated with the executable and DLL when the suspiciousness score is within a second range which is different than the first range, the second range indicating a higher level of suspiciousness than the first range.

The one or more ransomware countermeasures can include activating a tripwire process in which processes associated with the executable and DLL are subject to a higher level of monitoring.

The one or more ransomware countermeasures can include initiating one or more processes to stimulate behavior indicative of ransomware by the executable and DLL.

The suspiciousness score can be zero when there are no parent processes associated with the executable and DLL (i.e., the process is the root process, etc.).

The executable and/or DLL can be accessed or executed by an endpoint having an agent thereon. The agent can extracting the one or more features from the executable and/or DLL and transmit the extracted one or more features to a remote server executing the at least one machine learning model. The remote server can take various forms including a bastion host and/or a server configured to host a single application or process to minimize vulnerability to a ransomware attack.

Features can be generated based on various aspects including one or more: of when the executable and/or DLL is accessed, active processes using application programming interfaces (APIs), reputational information regarding the executable and/or DLL or modules being utilized in an active process, system-wide changes, or patch-level changes. These generated features can be further input into the at least one machine learning model to generate the suspiciousness score.

The one or more ransomware countermeasures can include generating shadow copies of files of interest. The shadow copies can be volume snapshot service (VSS) generated snapshots which can be accessed through key recovery mechanisms.

The one or more ransomware countermeasures can include delaying deletion of files of interest. The delaying of deletion of the files of interest can be implemented by hooking areas of a file system or kernel calls so that the files of interest are temporarily moved whenever a deletion attempt occurs.

In an interrelated aspect, access to executables and/or dynamic linked libraries (DLL) is monitored across various nodes of a distributed computing environment. One or more features are extracted from each accessed executable and/or DLL. The extracted features are input into at least one machine learning model to generate a suspiciousness score for each accessed executable and/or DLL. The at least one machine learning model can be trained to determine whether the executable file comprises ransomware. An execution of trust score is then determined, using the extracted features and the suspiciousness score, for each executable and/or DLL characterizing one or more associated parent processes. One or more ransomware measures can be initiated when one or both of the suspiciousness score and the execution chain of trust score are above a pre-determined threshold.

The one or more ransomware countermeasures are initiated solely on the node accessing the corresponding executable and/or DLL. In other variations, the one or more ransomware countermeasures can be initiated on a plurality of the nodes including the node accessing the corresponding executable and/or DLL.

In another interrelated aspect, data is received that comprises or characterizes an executable and/or DLL. Thereafter, one or more features from the received data are extracted which are indicative of both of: (i) an execution chain of trust characterizing one or more events preceding a requested execution event specified in the executable or DLL and (ii) a presence of a suspiciousness indicators. The extracted features are input into at least one machine learning model trained to determine whether the executable and/or DLL comprises ransomware. The executable and/or DLL can be prevented from executing or continuing to execute based on a determination that the executable and/or DLL comprises ransomware. In addition, the executable and/or DLL can be allowed to execute or continue to execute based on a determination that the executable and/or DLL does not comprise ransomware.

In a further interrelated aspect, accessed to executables are monitored across each of a plurality of nodes (e.g., endpoints, servers, etc.) forming part of a computing environment. Feature are extracted for each executable which are indicative of each of: (i) an execution chain of trust characterizing one or more events preceding a requested execution event; (ii) a presence of a suspiciousness indicators, and (iii) events surrounding the access of the executable. The extracted features are input into at least one machine learning model trained to determine whether the executable comprises ransomware. The executable is prevented from executing or continuing to execute based on a determination that the executable comprises ransomware, Otherwise, the executable is allowed to execute or continue to execute based on a determination that the executable does not comprise ransomware.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages such as enhanced detection of ransomware prior to its execution as well as advanced techniques for countering ransomware after it has initiated execution.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
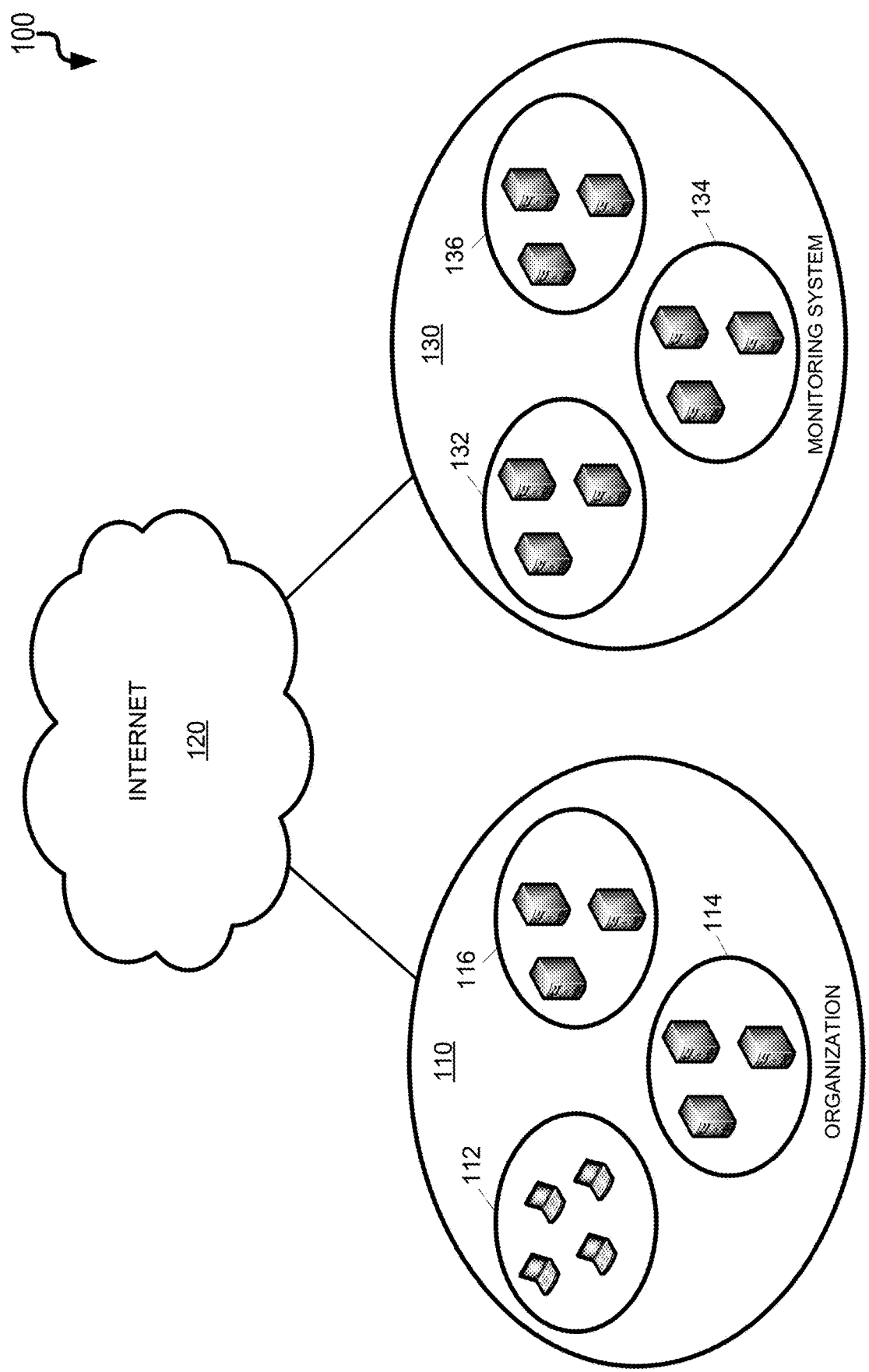
FIG. 1 is a first diagram illustrating an architecture for preventing ransomware which utilizes machine learning.

FIG. 1 is an example architecture diagram which is directed to the computing resources of an organization 110 which are monitored, in part, via a computer network 120 (e.g., the Internet, etc.) by an antiransomware monitoring system 130. The organization computing resources 110 can include a plurality of endpoints 112 (i.e., endpoint computing devices, etc.), a plurality of servers 114, and, as will be described below, a plurality of aggregators 116. The aggregators 116 can comprise dedicated computing devices and/or software executing on one of the endpoints 112 or servers 114 within the organization. Agents operated and/or monitored by the monitoring system 130 can be deployed on the endpoints 112 and servers 114. The agents can collect data, watch events, respond to events, and perform operations on the computing device on which it is installed. These agents can provide identify and provide relevant information relating to a potential ransomware attack or other malicious activities.

The monitoring system 130 can include various computing devices which are segregated by tenant system 132 (i.e., data associated with the organization can be maintained separately from the data associated with other entities/organizations). The tenant systems 132 can store organizational information, configuration information, and can communicate with agents deployed on the organization's networks. In the absence of aggregators 116, the agents described above can communicate directly with a corresponding tenant system 132 and some functionality may be reduced.

The monitoring system 130 can include various computing devices for analyzing or handling incoming data feeds 134 (received via the network 120) associated with the organization computing resources 110 or from other outside sources. Further, the monitoring system 130 can include analysis servers 136 which can analyze the data feeds 134 in order to assess whether software executing by the organization computing resources 110 is likely to comprise ransomware or malware. This analysis can be at different granularities from the event/process level up to an orchestration (i.e., data exchange, etc.) across different computing devices. Stated differently, the monitoring system 130 is responsible for storing, processing, and the creation and distribution of detection logic.

As noted above, aggregators 116 can be deployed within the enterprise computing resources 110. The aggregators 116 can serve various functions. As an example, the aggregators 116 can act as a local distributor of information, in order to reduce the bandwidth requirement of the product (i.e., they reduce the amount of network traffic with the monitoring system 130). The aggregators 116 can also act as a bastion host, allowing the monitoring system 130 to perform operations on a customer's network outside of an agent. A bastion host, in this context, can be a special purpose computer on the network of the organization that is specifically defined and configured to withstand attacks. The aggregator 116, in such scenarios, can host a single application or process to minimize the threat of such computer (as opposed to executing multiple applications which increases the overall threat level for the aggregator 116).

Figure 2:
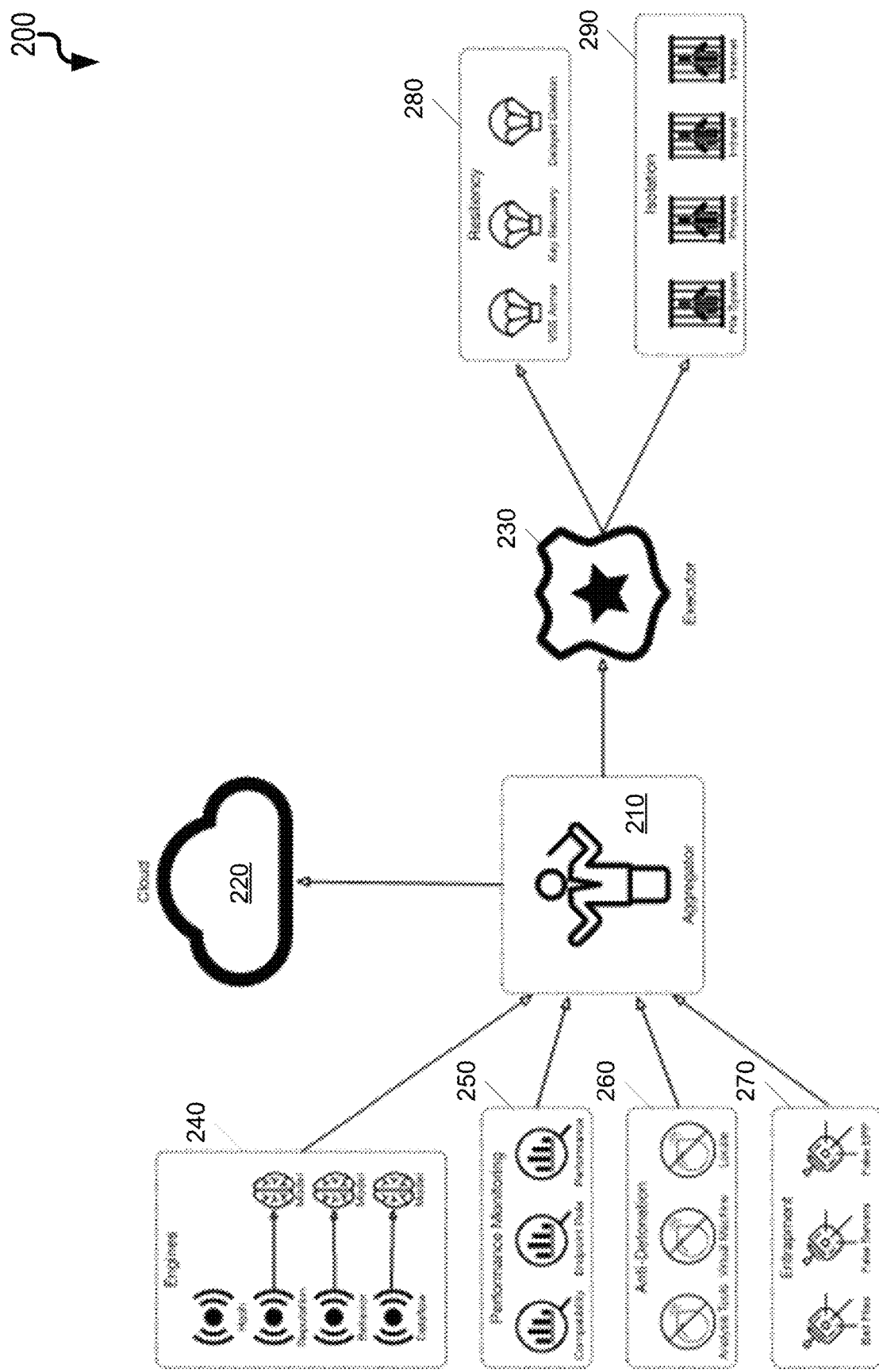
FIG. 2 is a second diagram illustrating an architecture for preventing ransomware which utilizes machine learning.

FIG. 2 is a diagram illustrating various components that can form part of an agent. The aggregator 210 can be responsible for invoking all of measurement components (described in further detail below), collect the data generated by such measurement components, and pass such data either directly to an off-system aggregator (e.g., an aggregator forming part of the monitoring system 130). The executor 230 can ameliorate information through synthesis of input information such as looking at the statistics of individual pieces of input information, combining disparate pieces of input information, or using a model to derive a higher level meaning from base input information, and execute decision logic which can cause certain software/processes from executing/continuing to execute, etc. The executor 230 can also be used to activate optional components such as sandboxes, file system virtualization and isolation, and components which would have an impact on a process' performance but would be desirable when the process meets a level of suspiciousness.

Within the architecture of FIG. 2, there can be several measurement components 240-290 which feed data to the aggregator 210 and/or can be activated by the executor 230. These components fall under one of several categories.

An information producer component can produce information that specifies or characterizes when files are accessed, processes using system APIs, information regarding the reputation of the binary or modules (i.e., code being analyzed, etc.) in the process, system-wide changes, and patch level changes. This information can be produced based on events that are occurring on the system so that the executor 230 can make informed decisions. Example information producer components can include engines 240, a performance monitoring component 250, and a resiliency component 280.

The engines 240 can perform various activities including hashing data (e.g., executables and other code, etc.) and executing various models (e.g., machine learning models, statistical models, etc.) which can characterize reputation, behavior, and/or dataflow of the various software in relation to maliciousness including the likelihood of such software being ransomware. These characterizations, in turn, can be used to determine whether or not some sort of corrective action (e.g., ransomware countermeasures, isolating software, limiting access to software, preventing software from executing, etc.) might need to be undertaken to prevent ransomware from activating and/or continuing to execute. The machine learning models can take various forms (e.g., neural networks, regression models, support vector machines, random forest, etc.) and can be trained, in some cases, using historical data with known classifications or labels. In some cases, weak supervision can be utilized while a system is first deployed to generate sufficient data to further train the model(s). The models can also be trained using unsupervised, semi-supervised, or reinforced learning techniques.

The performance monitoring component 250 can monitor aspects such as compatibility, endpoint role, as well as overall performance. For instance, as new protection measures (i.e., ransomware countermeasures) fundamentally change the way the system operates, this component can measure whether or not those changes to the operating system are relevant to the system's adjacent programs (so that countermeasures can be deployed or activated to not affect system performance above a pre-defined threshold/metric, etc.). The endpoint role can be a category that the system or computing device represents such as web server, database server, accountant workstation or developer workstation. The endpoint role can then be used to customize the protection that is applied to optimize parameters of the protection for that endpoint based on its role (i.e., a role-based approach can be applied to each computing device being protected using the current subject matter). Finally, overall performance can be monitored to determine the impact of the endpoint on the system and the cause of any detrimental performance to provide a closed loop on optimizing the system for the endpoints.

The resiliency component 280 can provide various operations which can help maintain access to the data of the organization even if the ransomware detonates. For example, the resiliency component 280 can leverage shadow copies of files (e.g., volume snapshot service (VSS) generated snapshots). The resiliency component 280 can provide mechanisms for key recovery. The resiliency component 280 can further be configured to delay deletion of files on the various endpoints 112 and servers 114. Such delays can be implemented, for example, by hooking areas of the file system or kernel calls so that the files are temporarily moved whenever a deletion attempt occurs.

Simulacrum components be software executables or processes that can simulate properties on the system for the purposes of behavior amplification or triggering self-immolation within malware. The term simulacrum, as used herein, refers to computer-implemented/software techniques to simulate changes in properties of the system being monitored (while not actually changing such properties). For example, simulacrum can be deployed or executed to trigger actions by potential ransomware which can be countered or which can confirm that an executable/DLL is indeed ransomware. In some examples, simulacrum can represent that certain system components exist when they do not, obscure certain system components, and/or change an identity type of system components. This representation will consist of having signs of those conditions, without having those actual conditions. Simulacrum components can include an anti-detonation component 260 and an entrapment component 270.

The anti-detonation component 260 can execute various ransomware countermeasures to prevent ransomware from detonating (i.e., activating). These operations can include analysis tools to identify or otherwise characterize the particular type of ransomware being deployed. The anti-detonation component 260 can also initiate a sandbox environment for the software in question. For example, the sandbox environment can cause one or more processors associated with an executable or DLL in question to be executed and monitored by a virtual machine (so as not to affect the operation of any receiving computing device, etc.). In addition, in some cases, the anti-detonation component 260 can spoof or otherwise change locale information of the endpoints. In this regard, as one example, some hostile software has code that will render itself inactive if the system appears to be in a country contained within the Commonwealth of Independent States. Additionally, some hostile software has code that will attempt to detect if it is being analyzed and hide the software's intent by rendering its ransomware properties inactive. The anti-detonation component 260 can take advantage of these behaviors as well as others that similarly render hostile software inactive.

The entrapment component 270 can be used to trigger or otherwise encourage behavior from an executable/DLL that, if present, indicates that the executable/DLL include ransomware. The entrapment component 270 can create and deploy bait files (i.e., files which appear to comprise sensitive information but which are otherwise not useful to the enterprise such as fake personnel data). Further, the entrapment component 270 can create fake servers and/or fake extensible provisioning protocol (EPP) status codes and the like to further interact with the ransomware to confirm its malicious intent and/or disable such ransomware. The information about the entrapment component 270 can be used to neutralize ransomware before and/or after it initiates.

Mechanism modification components 280 and 290 can change how the organization computing resources 110 operate to reduce the impact of malware's actions on these resources. These mechanism modification components 280, 290 can be selectively applied to suspicious processes/DLL so as to avoid a negative impact on the system (which would occur if the components were applied evenly to every process on the system). This arrangement allows these mechanism modification components 280, 290 to reduce negative impact of hostile code/processes while retaining desirable system parameters such as performance (i.e., system performance can be affected up until a certain threshold, etc.). Example mechanism modification components can include an isolation component 290 and the resiliency component 280.

The isolation component 280 can take various measures to prevent access by software suspected to include ransomware including a local file system on an endpoint 112 or server 114. The isolation component 290 can also prevent a process being executed by an endpoint 112 or server from accessing or using other resources. Further, the isolation component 290 can be used to prevent a particular endpoint 112 or server 114 from accessing an intranet and/or the internet.

Action components can perform actions on an endpoint 112 such as to install patches or terminate the execution of malware. The isolation component 290 can be a type of action component.

When an action is taken by a user or a program in the organization computing resources 110 in which a malware sample may be executed, the executor 230 can include a mechanism that can generate a notification that such an event is going to take place, before that event takes place. At this point in time, the pre-execution engines can analyze the events surrounding the execution of a process or DLL including aspects relating to one or more of an execution chain of trust, a provenance of the corresponding executable, a category of the executable, suspicious indicators and the like. The pre-executing engines can extract or otherwise generate features for any of these categories and later make such features (e.g., in the form of a vector, etc.) to one or more machine learning models.

With the execution chain of trust, the trustworthiness of the execution chain following all parents of the execution event can be analyzed. For example, when a user double clicks on an executable using a MICROSOFT WINDOWS system, explorer.exe is responsible for making the execution request. However, if an attacker were to exploit a GOOGLE CHROME browser to launch malware, then GOOGLE CHROME would be responsible for creating the request. These two different parentages of execution yield a different trustworthiness value for the execution. This can be accomplished by the executor 230 observing the creation of processes, and the process responsible for that creation. When an exploit hits GOOGLE CHROME to launch a process, the executor 230 can see that request with GOOGLE CHROME as the requestor. Similarly, the executor 230 can see the request made with explorer.exe as the requestor and mark the newly requested process as having a parent of explorer.exe. As both of these parents processes have differing levels of trust/suspiciousness due to their manufacturers, binary properties, and relevant attack history, the resulting child process can inherit those trust/suspiciousness levels and/or have suspiciousness scores based on parent suspicion scores.

The provenance of the executable can be determined or characterized by analyzing various properties of an executable. These properties can include one or more of: code signature correctness, company of origin, source of an executable (e.g., USB or other solid state drive, downloaded over the internet, etc.), compiler used to generate the binary, date and time of the production of the binary, number of machine hours spent safely executing the program locally and across the organization computing resources 110 and the like.

The category of the executable can be determined by analyzing various attributes including presence of an executable obfuscator, make, model, and settings of executable obfuscator, language and compiler used to produce the executable, imports and exports of the executable, strings present within the executable, executable resource, size of an executable and the like. Examples of software categories include: platform and management, education and reference, home and entertainment, productivity suites, multimedia players, file viewers, web browsers, collaboration tools, enterprise resource management, customer relations management, supply chain and manufacturing tasks, application development, information management and access, product manufacturing and delivery and the like. These software categories are important so that the model can relate executable features as being related to a specific product category that has a specific set of manufacturers. For example, ransomware may have properties related to administrative categories or productivity suites. These aspects can be observed by the engines 240, for example, by using the information synthesis in the executor 230. Since these two categories are distinct, but observed to be overlapping, they can be used to make a negative judgement by the executor 230.

Suspicious indicators (i.e., attributes or features which are suggestive of ransomware/malware, etc.) can be analyzed. Example indicators can include: modified rich headers, entropy of sections, presence of URLs, section names, presence of appended data, checksum disagreement. As with all of the collected information, features can be extracted or otherwise generated for use by a downstream application or process (e.g., one or more machine learning models, etc.).

These categories of events/attributes can be collectively taken into account as either a score or dimension for the executable (or otherwise utilized by a machine learning model). Some or all of these dimensions can be fed into each other to determine whether they agree. As an example, it is unlikely that something that appears to be an administrative tool should use an executable obfuscator, have a high number of suspicious elements, and is not signed by the company that produced the program. If these measured elements disagree to a high enough certainty, then the monitoring system 130 can prevent the executable from executing (either directly or via one of the deployed agents). If the measurement elements do not produce enough certainty, then the monitoring system 130 can allow the executable to execute. The monitoring system 130 can log these different dimension values in what can be viewed as a suspiciousness value that will follow the program throughout its execution. These suspiciousness values are generated by taking the output of the engines 240 anti-detonation 260 and entrapment 270 components and using algorithms to optimally combine them. In some variations, the scores can be weighted and added together. In other variation, these scores and other extracted features can be input into a machine learning model such as a convolutional neural network whose weights have been trained to produce an optimal output value.

If the monitoring system 130 determines that a program will be allowed to run, the next decision it will make is whether the program is a good candidate for imposing artificial simulacra. For programs that are not suspicious, which is the majority of programs, no artificial simulacra will be imposed. This decision allows increased compatibility and improved performance by the monitoring system 130 because all of the software that an organization would want to run without impediment will fall within the "not suspicious" category.

For programs that rise to the level of suspicion to warrant simulacra, The monitoring system 130 can inject various simulacrum within the program's view of the environment. Such injections can be accomplished through various means including kernel hooking, file system filters, and network drivers all falling under the executor 230.

There are two primary purposes behind the simulacra. The first is to trigger malware's built in anti-detonation protection mechanisms. The operating environment on the endpoint 112 and/or server 114 can be modified in order to have the executable (i.e., the suspected malware) to determine that it is operating within a restricted geographic region. For example, Russian malware authors prevent their software from performing malicious actions against Russian computer systems and such features can be used to effectively disable malware. The simulacra can also be used to generate properties that lead the executable to conclude that it is being analyzed. Such an arrangement can specify the presence of analysis tools on the corresponding endpoint 112 or server 114 (which would cause the executable to undertake some anti-detonation processes to prevent it from being disabled) and/or indicators that the software is being debugged.

The simulacra can also be used to simulated properties that lead the executable to conclude that the corresponding endpoint 112 or server 114 (or collection of computing devices within the organization computing resources 110) is not valuable. For example, the simulacra can indicate that the system is a virtual machine and/or can obscure or otherwise hide user personal files (i.e., the absence of which indicating that the system is not useful for ransomware purposes).

The simulacra can be used to simulate properties that the executable to believe that it has already ran. As an example, some malware creates a mutex, flag file, or checks for custom file extensions in order to prevent doubly encrypting a machine and such artifacts can be simulated by the simulacra.

The second purpose behind injecting simulacra within the malware's view of a system (i.e., the operating environment) is to increase the amount of bad behavior the executable will exhibit. The performance monitoring component 250 can measure behavior of the executable which will increase the amount of signal upon which the monitoring system 130 can judge the executable (i.e., more data will be available which the models can consume in characterizing the executable, etc.). Additionally, any behavior oriented endpoint protection that is running concurrently on the endpoint 112 can also observe the bad behavior and be more capable of making a judgment against the executable. Examples of this type of simulacra include the following simulating the presence of multiple endpoint protection products (on each endpoint point 112 or server 114). The performance monitoring component 250 can monitor attempts of the executable in disabling such endpoint protection products. The presence of database software can be simulated as some types of ransomware will attempt to stop or otherwise interface with database servers so that the malware can encrypt the database. The simulacra can simulate the presence of artificial user files which some types of ransomware attempt to access (and for which there is no legitimate reason for the executable to access such artificial user files). The simulacra can simulate the presence of backup software which some types of ransomware will attempt to stop and remove previous backups so that the user will not have backups available.

For an executable whose anti-detonation features have been triggered, the execution will stop. Additionally, the performance monitoring component 250 can measure that the anti-detonation features have been triggered and other resources forming part of the organizational computing resources 110 can be updated so that it may stop the executable more expediently on other endpoints 112 and/or servers 114. For executables that have not triggered anti-detonation features, execution can continue with this augmented perspective of the system (so that the performance monitoring component 250 can obtain additional information regarding the executable).

Figure 3:
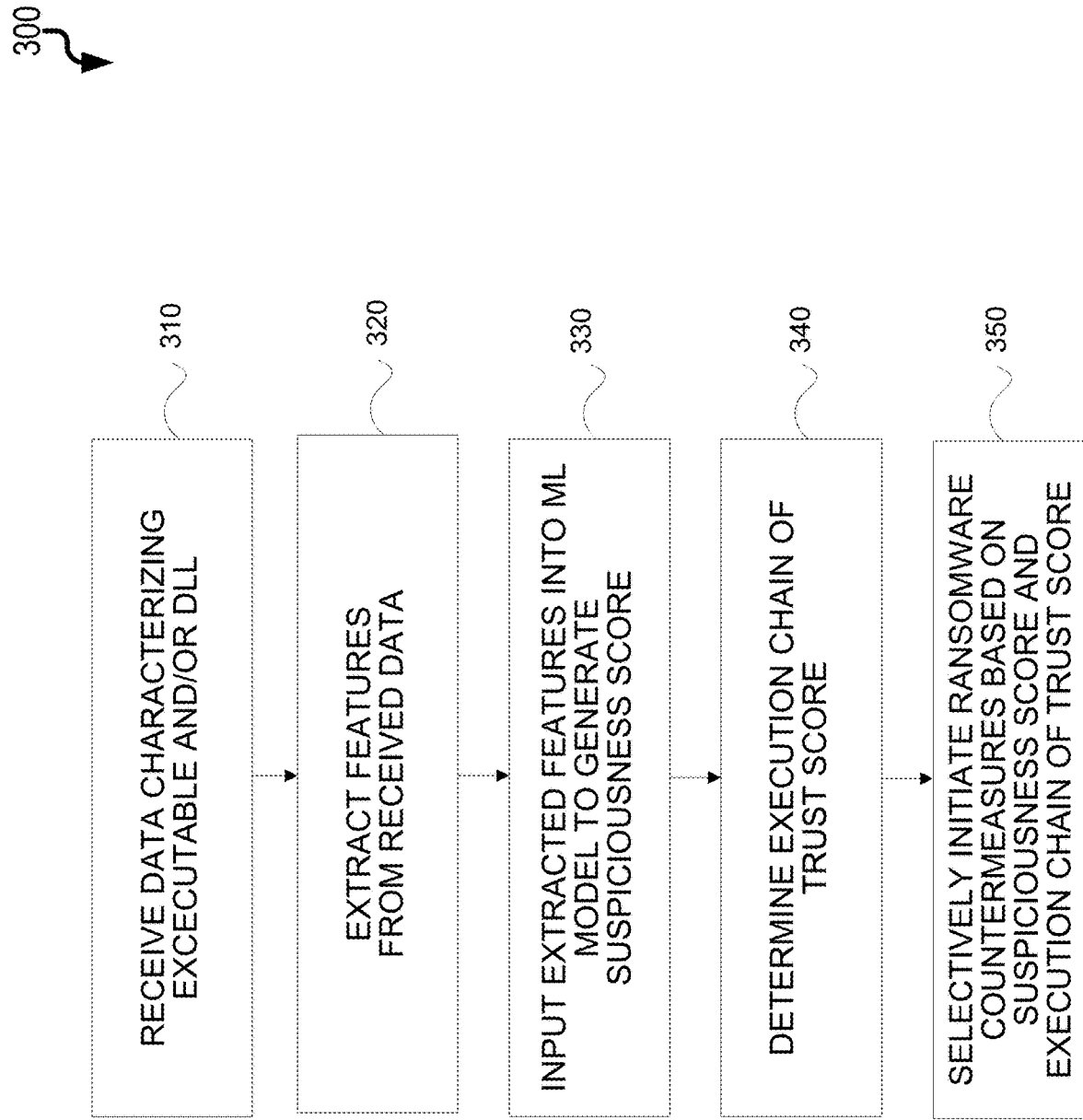
FIG. 3 is a first process flow diagram illustrating for preventing ransomware utilizing machine learning.

FIG. 3 is a process flow diagram 300 in which, at 310, data is received that comprises or characterizes an executable and dynamic linked library (DLL). Features are then extracted, at 320, from the executable and DLL. The extracted features are input, at 330, into at least one machine learning model to generate a suspiciousness score. The machine learning model can be trained to determine whether the executable file comprises ransomware. An execution chain of trust score for the executable and DLL can later be determined, at 340, based on the extracted features and the suspiciousness score. This execution chain of trust score for the executable and DLL characterizes one or more associated parent processes. This suspiciousness score and the execution chain of trust score can be used, at 350, to determine whether or not to initiate one or more ransomware countermeasures.

Figure 4:
FIG. 4 is a second process flow diagram for preventing ransomware utilizing machine learning.

FIG. 4 is a process flow diagram 400 in which, at 410, execution of an executable is initiated in an operating environment. Thereafter, at 420, characteristics associated with the execution of the executable are continually monitored. It is later determined, at 430, that the executable has one or more characteristics associated with ransomware. In response to such determination, at 440, at least one simulacra is injected into the operating environment to attempt to trigger an anti-detonation protection feature by the executable file. Subsequently, at 450, one or more ransomware countermeasures can be initiated based on behavior of the executable after injection of the at least one simulacra.

Figure 5:
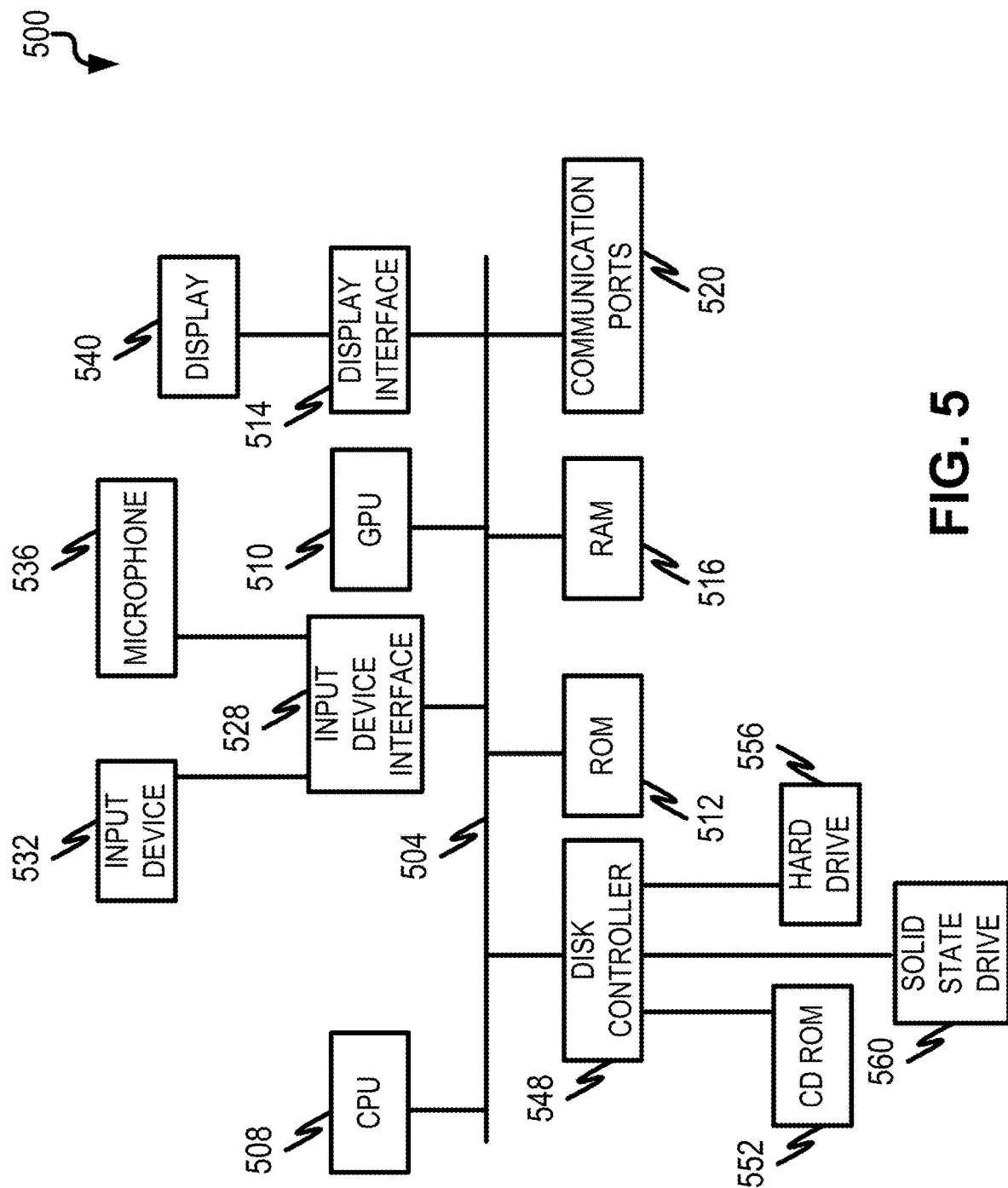
FIG. 5 is a diagram illustrating aspects of a computing device for implementing aspects of the current subject matter.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. In addition, a processing system 510 labeled GPU (graphics processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal drive including solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., an LED, LCD, etc. monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   initiating execution of an executable in an operating environment being executed on an endpoint computing device;
   continually monitoring, by an agent executing on the endpoint computing device. characteristics associated with the execution of the executable;
   determining, based on the monitoring and during execution of the executable, that the executable has one or more characteristics associated with ransomware;
   injecting, responsive to the determining, at least one simulacra into the operating environment to trigger an anti-detonation protection process by the executable in order to prevent ransomware associated with the executable from being disabled, the at least one simulacra generating artifacts causing the ransomware to believe it has initiated double encrypting countermeasures, the artifacts comprising any one of a: mutex, flag file or custom file extension;
   determining, based on the continual monitoring and based on interaction between the executable and the injected at least one simulacra, that the executable comprises ransomware; and
   initiating, based on the determination that the executable comprises ransomware and prior to the ransomware executing, one or more ransomware countermeasures to prevent the ransomware from activating.

2. The method of claim 1, wherein the at least one simulacra comprises a software executable or processes that simulate properties of the operating environment for triggering ransomware self-immolation.

3. The method of claim 1, wherein the at least one simulacra causes at least one system component of the operating environment to be obscured.

4. The method of claim 1, wherein the at least one simulacra causes an identity type of at least one system component of the operating environment to change.

5. The method of claim 1, wherein the at least one simulacra initiates a sandbox environment in which the executable is executed and monitored by a virtual machine, the sandbox environment being different from the operating environment.

6. The method of claim 1, wherein the at least one simulacra spoofs or changes a location of endpoints forming part of the operating environment.

7. The method of claim 1, wherein the at least one simulacra deploys bait files which appear to comprise sensitive information for access by the ransomware.

8. The method of claim 1, wherein the at least one simulacra creates fake servers to interact with the ransomware to confirm malicious intent.

9. The method of claim 1, wherein the at least one simulacra creates fake servers to disable the ransomware.

10. The method of claim 1 further comprising: collecting information about the ransomware by an entrapment component.

11. The method of claim 1, wherein the at least one simulacra causes the ransomware to conclude that a corresponding endpoint or server accessing the executable is not valuable.

12. The method of claim 11, wherein the at least one simulacra indicates that the corresponding endpoint or server is a virtual machine.

13. The method of claim 1, wherein the at least one simulacra causes files of interest to be hidden from the ransomware.

14. The method of claim 1, wherein the at least one simulacra simulates a presence of multiple endpoint protection products on each endpoint and/or server forming part of the operating environment, and wherein attempts to disable such multiple endpoint protection products are monitored.

15. The method of claim 1, wherein the at least one simulacra simulates a presence of backup software which the ransomware attempts to stop and remove previous backups.

16. The method of claim 1, wherein the at least one simulacra comprises a software executable or processes that simulate properties of the operating environment for ransomware behavior amplification.

17. A method comprising:
    initiating execution of a dynamic-link library (DLL) in an operating environment being executed by an endpoint computing device;
    continually monitoring, by an agent executing on the endpoint computing device, characteristics associated with the execution of the DLL;
    determining, based on the monitoring and during execution of the DLL, that the DLL has one or more characteristics associated with ransomware;
    injecting, based on the determining, at least one simulacra into the operating environment to attempt to entrap ransomware and/or to trigger an anti-detonation protection process by the ransomware to prevent the ransomware from being disabled, the at least one simulacra generating artifacts causing the ransomware to believe it has initiated double encrypting countermeasures, the artifacts comprising any one of a: mutex, flag file or custom file extension;

determining, based on the continual monitoring and based on interaction between the DLL and the injected at least one simulacra, that the DLL comprises ransomware; and initiating, based on the determination that the DLL comprises malware and prior to the ransomware executing, one or more ransomware countermeasures to prevent the ransomware from activating.

18. The method of claim 17, wherein the at least one simulacra:

causes files of interest to be hidden from the ransomware;

simulates a presence of multiple endpoint protection products on each endpoint and/or server forming part of the operating environment such that attempts to disable such multiple endpoint protection products are monitored;

simulates a presence of backup software which the ransomware attempts to stop and remove previous backups; or comprises a software executable or processes that simulate properties of the operating environment for ransomware behavior amplification.

19. A method comprising:

initiating execution of an executable in an operating environment being executed by an endpoint computing device;

continually monitoring, by an agent executing on the endpoint computing device, characteristics associated with the execution of the executable;

transmitting, by the agent to a remote antiransomware monitoring system, at least a portion of the characteristic;

determining, while the executable is being executed and by the antiransomware monitoring system, that the executable has one or more characteristics associated with ransomware;

injecting, based on the determining and by the antiransomware monitoring system, at least one simulacra into the operating environment comprising a software executable or processes that simulate properties of the operating environment for ransomware behavior amplification, the at least one simulacra generating artifacts causing the ransomware to believe it has initiated double encrypting countermeasures, the artifacts comprising any one of a: mutex, flag file or custom file extension;

determining, by the antiransomware monitoring system based on the continual monitoring and based on interaction between the executable and the injected at least one simulacra, that the executable comprises ransomware; and initiating, by the antriansomware monitoring system based on the determination that the executable comprises ransomware and prior to the ransomware, one or more ransomware countermeasures to prevent the ransomware from activating.

20. The method of claim 19, wherein the at least one simulacra:

causes files of interest to be hidden from the ransomware;

simulates a presence of multiple endpoint protection products on each endpoint and/or server forming part of the operating environment such that attempts to disable such multiple endpoint protection products are monitored;

simulates a presence of backup software which the ransomware attempts to stop and remove previous backups; or comprises a software executable or processes that simulate properties of the operating environment for ransomware behavior amplification.

\* \* \* \* \*